(12) United States Patent
Hernanz Manrique et al.

(10) Patent No.: US 7,597,283 B2
(45) Date of Patent: Oct. 6, 2009

(54) AUXILIARY POWER UNIT INTAKE DUCT WITH AERO-ACOUSTIC GUIDE VANES

(75) Inventors: Jose Angel Hernanz Manrique, Madrid (ES); Jürgen Heinrich Kruse, Dorum (DE)

(73) Assignee: Airbus Espana, S.L., Madrid (ES)

( * ) Notice: Subject to any disclaimer, the term of this patent is extended or adjusted under 35 U.S.C. 154(b) by 592 days.

(21) Appl. No.: 11/324,020

(22) Filed: Dec. 30, 2005

(65) Prior Publication Data
US 2006/0179846 A1 Aug. 17, 2006

(30) Foreign Application Priority Data
Dec. 31, 2004 (ES) ................................ 200403174

(51) Int. Cl.
*B64D 33/02* (2006.01)
(52) U.S. Cl. ....................................... 244/53 B; 60/751
(58) Field of Classification Search ............... 244/53 B; 137/15.1; 60/751, 39.092; 138/37
See application file for complete search history.

(56) References Cited
U.S. PATENT DOCUMENTS

| | | | | |
|---|---|---|---|---|
| 2,272,620 A | * | 2/1942 | Hoffar | ........................ 173/152 |
| 2,365,328 A | * | 12/1944 | Bell | ............................. 454/76 |
| 3,778,983 A | * | 12/1973 | Rygg | ........................... 55/306 |
| 4,058,141 A | * | 11/1977 | Hasinger et al. | .............. 138/39 |
| 4,354,346 A | * | 10/1982 | Wooding | .................. 60/39.092 |
| 4,685,942 A | * | 8/1987 | Klassen et al. | ................. 55/306 |
| 5,725,180 A | * | 3/1998 | Chamay et al. | ........... 244/53 B |
| 5,906,334 A | * | 5/1999 | Chamay et al. | ........... 244/53 B |
| 7,014,145 B2 | * | 3/2006 | Bagnall | ..................... 244/53 B |

* cited by examiner

*Primary Examiner*—Tien Dinh
(74) *Attorney, Agent, or Firm*—Klauber & Jackson LLC

(57) ABSTRACT

An auxiliary power unit intake duct for an aircraft, comprising
 an internal straight portion 1*a*, an internal first bend portion 1*b* and an internal second bend portion 1*c*, extending between an air inlet 2 and a plenum entry 3 of the auxiliary power unit,
 a plurality of acoustic guides vanes 4,5 located in the straight portion 1*a* of the intake duct 1, extending horizontally between opposite side portions of the straight portion 1*a*; and a plurality of curved aerodynamic guide vanes 6,7 located in the second bend portion 1*c* proximate to said plenum inlet 3, extending vertically between a top portion and a bottom portion of the second bend portion 1*c*, each of the curved aerodynamic guide vanes 6,7 being concentric with said bend curvature of the second bend portion 1*c*.

20 Claims, 4 Drawing Sheets

AUXILIARY POWER UNIT INTAKE DUCT WITH AERO-ACOUSTIC GUIDE VANES

RELATED APPLICATION

The present application claims priority from Spanish Application Serial No. 200403174, filed on Dec. 31, 2004. Applicants claim priority under 35 U.S.C. §119 as to said Spanish application, the entire disclosure of which is incorporated herein by reference in its entirety.

TECHNICAL FIELD OF THE INVENTION

The present invention relates auxiliary power units for aircraft and, particularly, to intake ducts for such power units.

BACKGROUND ART

As known, modern aircraft's are equipped with a plurality of electrical and electronic devices requiring an input of electrical power to fulfil their functions. Such devices are environmental controls and systems, as well as, especially in passenger aircraft's, outlets for passenger's use and comfort. Whilst electrical power is often provided by power generators driven by the engines of the aircraft, passenger aircraft's are nowadays aircraft's generally equipped with auxiliary power units ('APU') as an alternative, supplementary or additional source of power for electricity needed on the aircraft. APUs are used to supply electrical power to the aircraft's systems and components while the aircraft is parked on the ground, in flight and during taxiing or landing.

An APU is a gas turbine engine mounted in the tailcone or in the wheelwell of the aircraft, i.e. inside the aircraft so that an intake duct is needed to feed outside air to the APU, as well as an outlet duct through which exhaust gases are expelled from the APU. Typically, an APU comprises a compressor inlet ('plenum chamber'), a compressor, a combustor having a primary fuel nozzle and a secondary fuel nozzle, a turbine, a gas exhaust, and a shaft on which the compressor and the combustor are mounted for rotation on a shaft connected to a gearbox and the gearbox is connected to a power generator. When the shaft rotates, air is drawn through the intake duct to the compressor inlet, pressurized by the compressor, mixed with fuel in the combustor and ignited so that hot pressurized gas is formed. This gas expands across the turbine and leaves the APU through the gas exhaust. When expanding, the pressurized hot gas causes the turbine, shaft, and compressor to rotate.

The length, width and shape of an intake conduct is generally subject to position of the air intake and the position of the APU, and to the structural elements, components and/or aggregates that may be located between the air intake and the plenum entry of the APU. Thus, the air intake is normally be located in a forward position with respect to the APU so as to allow a stream of air to be guided to the APU in the smoothest possible manner. The duct air inlet is normally in connection with housing with an actuator flap used to close and open the air intake.

The APU plenum entry may be located in a position being lower or higher than the air intake or at the same level as the air intake. Thus, when the air intake is in higher position with respect to the APU, the first bend portion of the intake duct may extend downwards from the straight portion and connect with the second bend portion, whilst the second bend portion of the intake duct may extend leftwards or rightwards from the first bend portion. Also, when the air intake is in a lower position with respect to the APU, the first bend portion of the intake duct may extend upwards from the straight portion and connect with the second bend portion, whilst the second bend portion of the intake duct may extend leftwards or rightwards from the first bend portion.

APUs generate high levels of noise at the outside of the aircraft. This is especially unpleasant and even harmful when the APU is operating to power the aircraft systems prior to take off. An intake duct for the APU therefore must not only be suitable to efficiently provide a uniform flow of air to the APU but should also contribute to reduce noise propagation through the APU intake. For this purpose, it is known to place aeroacoustic guide vanes within an intake duct having a bend in a position following the curvature of the bend. Whilst this has proven to provide a rather efficient air-flow control and reduction of noise propagation, it is not fully satisfactory in respect of intake ducts having two bend portions, as for example in the case where the air intake is in an upper position with regard to the plenum inlet and where thus two internal bend portions are required on its path to the APU. Taking into account that the presence of the two internal bends leads to high values of flow distortion measured by the distortion coefficient in the plenum entry with the conventional guide vanes definition, conventionally placed guide vanes have proven to be unsatisfactory in intake ducts with two bended portions.

DESCRIPTION OF THE INVENTION

The present invention is intended to provide a vane structure for an intake duct with two bends that reduces noise propagation through the APU intake and simultaneously provides an efficient and uniform flow of air to the plenum entry of the APU. This is achieved by an auxiliary power unit intake duct with elongated guide vanes for an aircraft, the intake duct comprising an internal straight portion, an internal first bend portion, and an internal second bend portion, said portions extending between a duct air inlet and a plenum entry of the auxiliary power unit, the second bend having a first side wall having a first side wall curvature and a second side wall having a second side wall curvature, the second side wall being shorter than the first side wall;

the first bend portion extending between the straight portion and the second bend portion, said second bend portion having a bend curvature, wherein the intake duct further comprises:

a plurality of acoustic guides vanes located in said straight portion of the intake duct, said acoustic guide vanes extending horizontally between opposite side portions of said straight portion; and a plurality of curved aerodynamic guide vanes located in said second bend portion proximate to said plenum inlet, said curved aerodynamic guide vanes extending vertically between a top portion and a bottom portion of said second bend portion; each of said curved aerodynamic guide vanes being concentric with said bend curvature of said second bend portion.

By arranging the guide vanes in two different sets, i.e. one set comprised of the plurality of acoustic guide vanes in the straight part of the duct, and another set comprised of the plurality of aerodynamic guide vanes following the curvature of the second bend of the duct, a uniform flow velocities distribution in the APU plenum inlet is achieved in intake ducts for APUs comprising two bend portions, whereby the APU performances are improved and noise propagation through the duct air inlet is reduced. The guide vanes are in the shape of deflectors.

The plurality of acoustic guide vanes may comprise an upper acoustic guide vane and a lower acoustic guide vane being positioned such that the straight portion is divided into paths having the same heights. The upper acoustic guide vane may be longer than the lower acoustic guide vane and extend into the first bend portion when the first bend portion is bent downwards, whilst, when the first bend portion is bent upwards, lower acoustic guide vane may be longer than the upper acoustic guide vane.

The plurality of curved aerodynamic guide vanes may comprise
a curved first aerodynamic guide vane located in a radial position in the middle between at least a first external radius given by the first side wall curvature of said second bend portion and at least a first internal radius given by the second side wall curvature of said second bend portion
a curved second aerodynamic guide vane located between said first aerodynamic guide vane and said second sidewall. In this embodiment, the second aerodynamic guide vane is preferably shorter than the first aerodynamic guide vane.

The intake duct of the present invention preferably has a substantially quadrangular horizontal cross section such that the cross sections of its top and the bottom walls are longer than the cross sections of its sidewalls.

The curvatures of the side walls of the second bend portion of the intake duct do not need to be uniform but may be composed of a plurality differing arched sections, but is its important that the curvature of the guide vanes follows the curvature of the second bend portion. Thus, when any or both of the side wall curvatures comprises such a plurality of differing arched sections, the first aerodynamic guide vane may be comprised of an equal number of curved sections located in radial positions in the middle between a plurality of external radius given each by one of the differing arched sections of the first side wall curvature of said second bend portion, and at least said first internal radius given each by second differing arched sections of the second side wall curvature of said second bend portion or a plurality of internal radius given each by second differing arched sections of the second side wall curvature of said second bend portion.

In an embodiment of the invention where one or both of the side wall curvatures is composed of such a plurality of differing arched sections, a first curved section of the first aerodynamic guide vane is located in a radial position in the middle between the first external radius given by a first arched section of the first side wall curvature, and at least one internal radius given by a first arched section of the second side wall curvature of said second bend portion, whilst a second curved section of the curved first aerodynamic guide vane is located in a radial position in the middle between a second external radius given by a second arched section of the first side wall curvature and at least a second internal radius given by a second arched section of the second side wall curvature.

BRIEF DESCRIPTION OF THE DRAWINGS

Features relating to embodiments of the inventions will be explained hereinafter on the grounds of hereto attached drawings in which.

Figure 1:
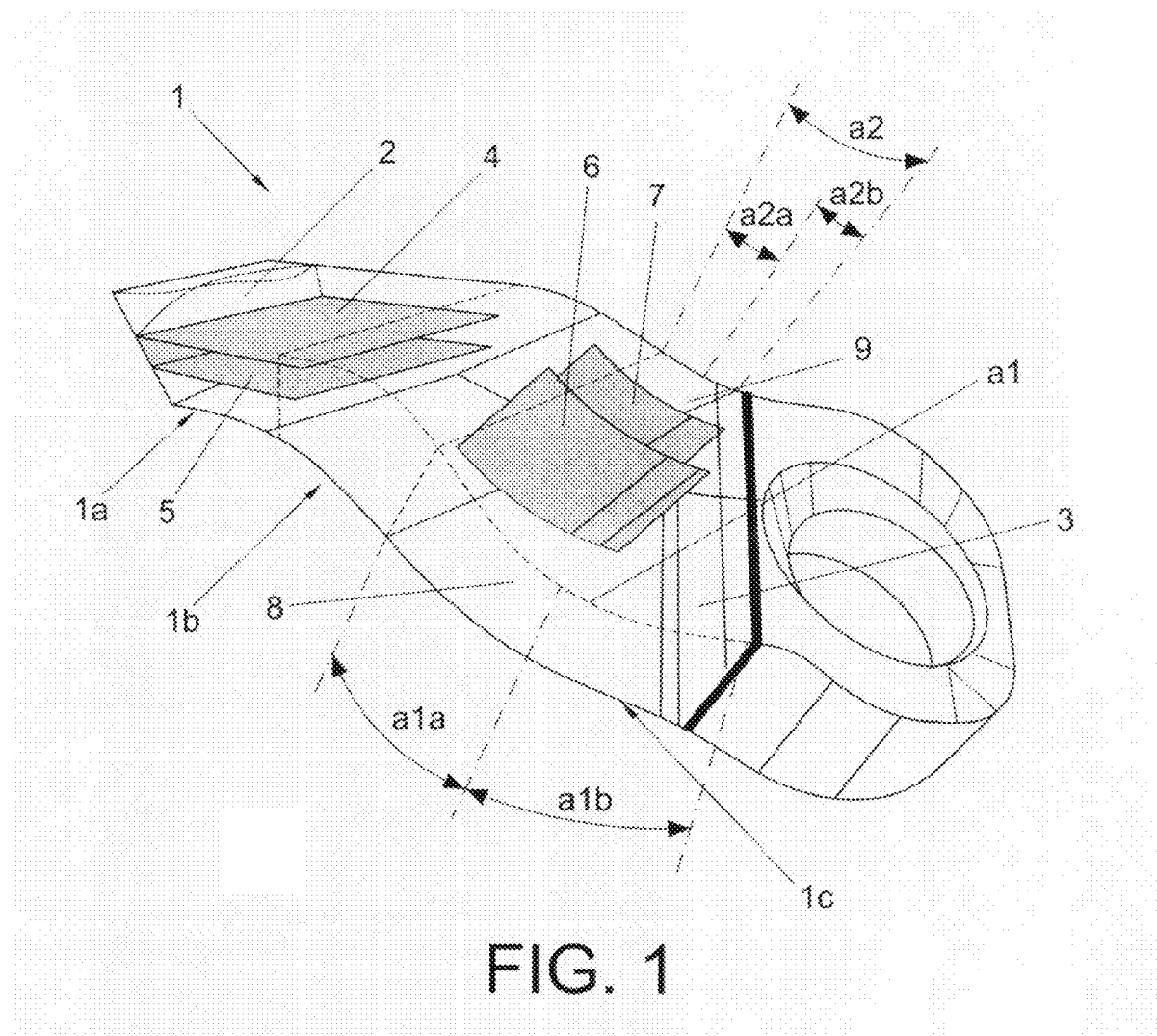
FIG. 1 is a schematic perspective top view of an embodiment of the intake duct according to the present invention showing the inside of the duct.

In these figures there are reference signs having the following meanings:
1 intake duct
1$a$ straight portion of the intake duct
1$b$ first bend portion of the intake duct
1$c$ second bend portion of the intake duct
2 duct air inlet
2$a$,2$b$,2$c$ flow paths
3 plenum entry of the APU
4 first acoustic guide vane
5 second acoustic guide vane
6 first curved aerodynamic guide vane
6$a$ first curved section of the first aerodynamic guide vane
6$b$ second curved section of the curved first aerodynamic guide vane
7 second curved aerodynamic guide vane
7$a$ first curved section of the second aerodynamic guide vane
7$b$ second curved section of the second aerodynamic guide vane
8 first sidewall of the second bend portion
9 second sidewall of the second bend portion
a1 first side wall curvature
a1$a$ first arched section of the first side wall curvature
a1$b$ second arched section of the first side wall curvature
a2 second side wall curvature
a2$a$ first arched section of the second side wall curvature
a2$b$ second arched section of the second side wall curvature
Rext first external radius of the first arched section of the first side wall curvature
Rext' second external radius of the second arched section of the first side wall curvature
Rint first internal radius of the first arched section of the second side wall curvature
Rint' second internal radius of the second arched section of the second side wall curvature
R1 radius defining the radial position of the first curved section of the first aerodynamic guide vane
R1' radius defining the radial position of the second curved section of the first aerodynamic guide vane
R2 radius defining the radial position of the first curved section of the second aerodynamic guide vane
R2' radius defining the radial position of the radial position second curved section of the second aerodynamic guide vane

EMBODIMENTS OF THE INVENTION

FIGS. 1 to 4 schematically show an embodiment of the intake duct of the present invention.

As shown in FIG. 1, the intake duct 1 has a substantially quadrangular cross section and comprises an internal straight portion 1$a$, an internal first bend portion 1$b$ and an internal second bend portion 1$c$ which extend between a duct air inlet 2 and a plenum entry 3 of a per se conventional auxiliary power unit (not shown in the drawings). The straight portion 1$a$ connects with the first bend portion 1$b$ that extends downwards and connects with the second bend portion 1$c$ that bends leftwards.

An upper acoustic guide vane 4 and a lower acoustic guide vane 5 are placed horizontally between the sidewalls of the straight portion 1$a$ of the duct 1. As the first bend portion 1$b$ of the intake duct 1 bends downwards, the upper acoustic guide vane 4 is slightly longer than the lower acoustic guide vane 5 and extends into the first bend portion 1b.

The second bend portion 1c has a first side wall 8 with a first sidewall curvature a1 and a second side wall 9 with a second sidewall curvature a2. The second side wall 9 is shorter than the first side wall 8. Two curved aerodynamic guide vanes 6,7 are located in the second bend portion 1c proximate to the plenum inlet 3. The aerodynamic guide vanes 6,7 extend vertically between the top wall and the bottom wall of the second bend portion 1c. One, i.e. the first curved aerodynamic guide vane 6 is located in a radial position in the middle between the first side wall 8 and the second side wall 9, approximately in the middle of the second bend portion 1c, whilst the second curved aerodynamic guide vane 7 is located between the first aerodynamic guide vane 6 and the second side wall 9 of the second bend portion 1c. The second aerodynamic guide vane 7 is shorter than the first aerodynamic guide vane 6. Both aerodynamic guide vanes 6,7 have a shape that follows the curvature of the second bend portion.

Figure 4:
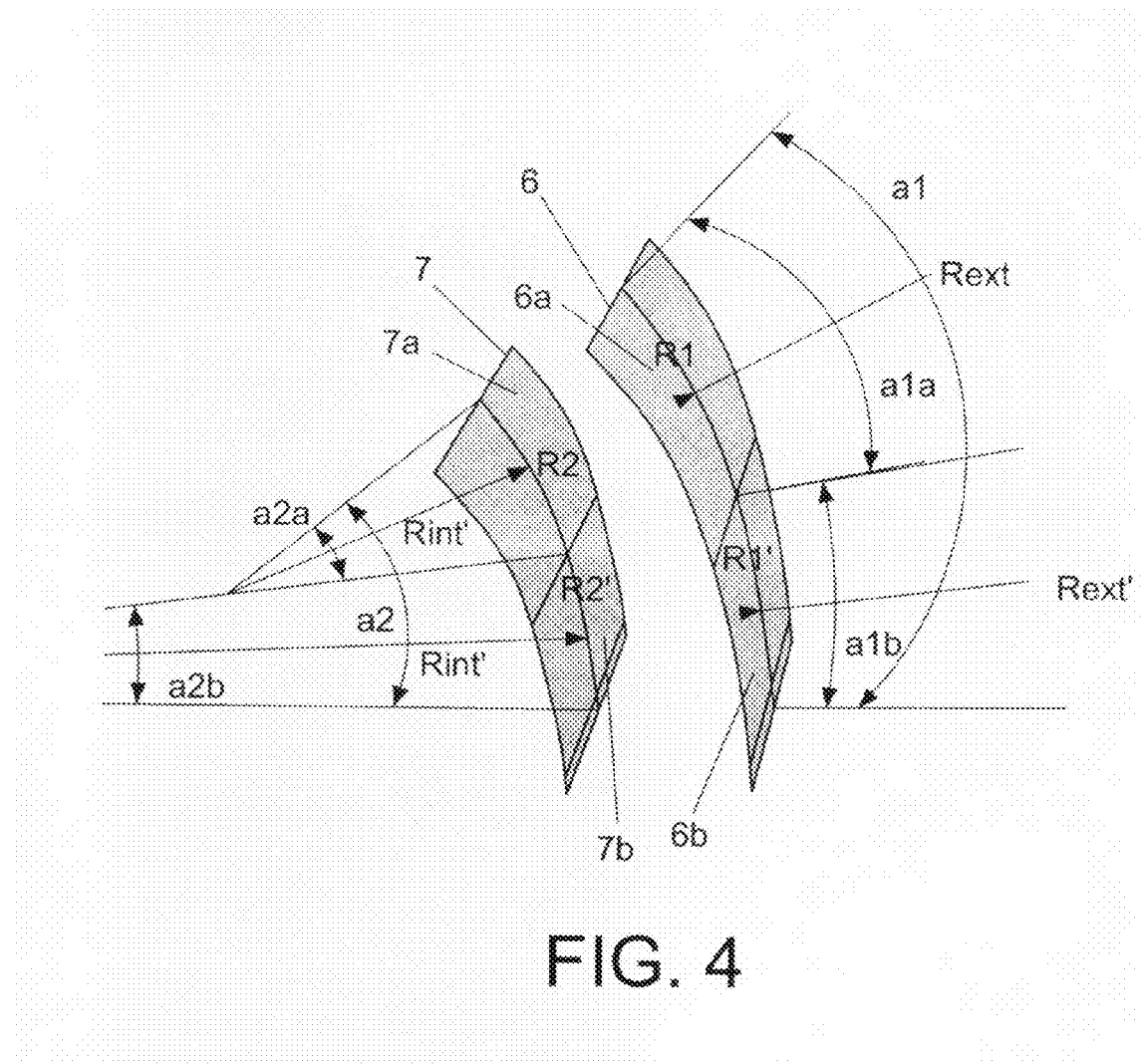
FIG. 4 is a schematic bottom perspective view of an embodiment of the curved aerodynamic guide vanes shown in FIG. 1.

As apparent from the combination of FIGS. 1 and 4, the first aerodynamic guide vane 6 comprised a first curved section 6a and a second curved section 6b. The first curved section 6a of the first aerodynamic guide vane 6 is located in a radial position R1 in the middle between the first external radius Rext given by a first arched section a1a of the first side wall curvature a1, and a first internal radius Rint given by a first arched section a2a of the second side wall curvature a2 of the second bend portion 1c. The second curved section 6b of the curved first aerodynamic guide vane 6 is located in a radial position R1' in the middle between a second external radius Rext' given by a second arched section a1b of the first side wall curvature a1 and a second internal radius Rint' given by a second arched section a2b of the second side wall curvature a2. FIG. 4 shows a possible relationship between the geometries of the curvatures of the second bend portion 1c and of the two aerodynamic guide vanes 6,7 in the embodiment of the intake duct shown in FIG. 1.

In the embodiment shown in FIG. 4,

R1 i.e. the radius of the first curved section 6a of the first aerodynamic guide vane 6 is of approx. 59 cm, R1' i.e. the radius of the second curved section 6b of the first aerodynamic guide vane 6 is of approx. 150 cm, R2 i.e. the radius of the first curved section 7a of the second aerodynamic guide vane 7 is of approx. 45 cm, R2' i.e. the radius of the second curved section 7b of the second aerodynamic guide vane 7 is of approx. 115 cm, a1a i.e. the first arched section of the first side wall curvature is an arched section of approx. 26.8°, a1b i.e. the second arched section of the first side wall curvature is an arched section of approx. 10.5°, a2a i.e. the first arched section of the second side wall curvature is an arched section of approx. 26.3°, a2b i.e. the second arched section of the second side wall curvature is an arched section of approx. 10.1°.

Figure 2:
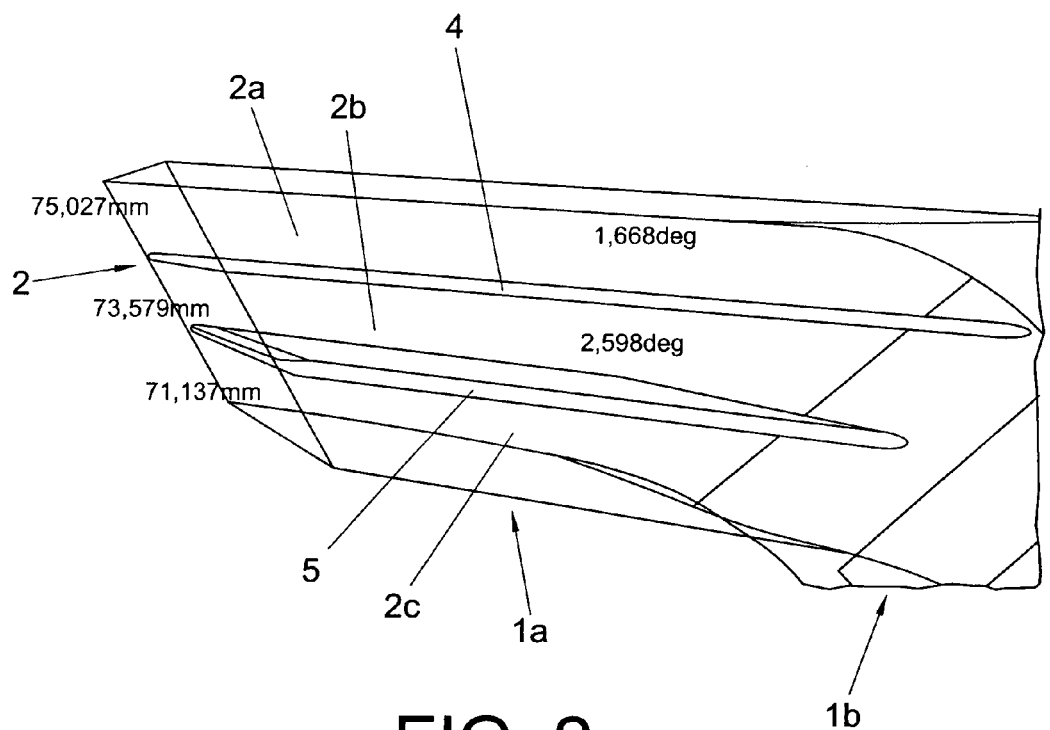
FIG. 2 is a schematic partial side view showing the straight portion from the duct air inlet side of the intake duct.
Figure 3:
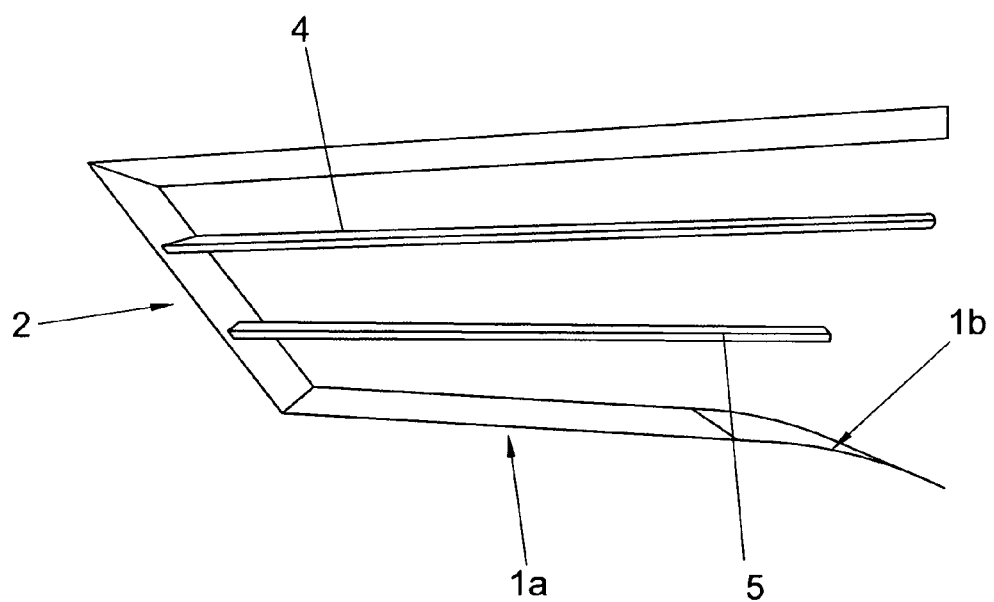
FIG. 3 is a schematic partial side view showing the straight portion towards the duct air inlet side of the intake duct.

As shown in FIGS. 2 and 3, the upper acoustic guide vane 4 and the lower acoustic guide vane 5 are positioned such that the straight portion 1a is horizontally divided into flow paths 2a,2b,2c. So as to avoid propagation of soundwaves through the duct air inlet 2, the longitudinal axes of the acoustic vanes 4,5 are slightly divergent in the direction of the free ends of the acoustic guide vanes 4,5 i.e. the flowpaths have a narrower cross section at the duct air inlet 2 than at the free ends of the acoustic guide vanes 4,5. Thus, the longitudinal axis of the upper acoustic guide vane 4 may deviate from the longitudinal axis of the top wall of the straight portion 1a of the intake duct by approx. 1.7°. The deviation between the longitudinal axis of the upper acoustic guide vane 4 and the longitudinal axis of the lower acoustic guide vane 5 may be approx. 2.6°. The deviation between the lower acoustic guide vane 5 and the longitudinal axis of the bottom wall of the straight portion 1a of the intake duct by approx. 2.7°.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. An auxiliary power unit intake duct with aero-acoustic guide vanes for an aircraft, the intake duct comprising
    an internal straight portion, an internal first bend portion and an internal second bend portion, said internal portions extending between a duct air inlet and a plenum entry of the auxiliary power unit, the second bend having a first side wall having a first side wall curvature and a second side wall having a second side wall curvature, the second side wall being shorter than the first side wall, the first bend portion extending between the straight portion and the second bend portion, said second bend portion having a bend curvature; and
    wherein the intake duct further comprises
    a plurality of acoustic guides vanes located in said straight portion of the intake duct, said acoustic guide vanes extending horizontally between opposite side portions of said straight portion; and
    a plurality of curved aerodynamic guide vanes located in said second bend portion proximate to said plenum inlet, said curved aerodynamic guide vanes extending vertically between a top portion and a bottom portion of said second bend portion; each of said curved aerodynamic guide vanes being concentric with said bend curvature of said second bend portion.

2. An auxiliary power unit intake duct according to claim 1, wherein said plurality of acoustic guide vanes comprise an upper acoustic guide vane and a lower acoustic guide vane being positioned such that the straight portion is horizontally divided into flow paths.

3. An auxiliary power unit intake duct according to claim 2, wherein the first bend portion of the intake duct bends downwards, and the upper acoustic guide vane is longer than the lower acoustic guide vane and extends into the first bend portion.

4. An auxiliary power unit intake duct according to claim 2, wherein the intake duct has a substantially quadrangular horizontal cross section.

5. An auxiliary power unit intake duct according to claim 3, wherein the intake duct has a substantially quadrangular horizontal cross section.

6. An auxiliary power unit intake duct according to claim 1, wherein the first bend portion of the intake duct bends downwards and the lower acoustic guide vane is shorter than the upper guide vane and extends into the first bend portion.

7. An auxiliary power unit intake duct according to claim 6, wherein the intake duct has a substantially quadrangular horizontal cross section.

8. An auxiliary power unit intake duct according to claim 1, wherein the plurality of curved aerodynamic guide vanes comprise
    a curved first aerodynamic guide vane located in a radial position R1 in the middle between at least a first external radius (Rext) given by the first side wall curvature of said second bend portion and at least a first internal radius (Rint) given by the second side wall curvature of said second bend portion, and a curved second aerodynamic guide vane located in a radial position R2 in the middle between said first aerodynamic guide vane and said second sidewall.

9. An auxiliary power unit intake duct according to claim 8, wherein the first side wall curvature is comprised of a plurality of differing first arched sections (a1*a*; a1*b*);

the first aerodynamic guide vane is comprised of a plurality of curved sections being equal in number to said first arched sections;

said curved sections are located in radial positions in the middle between a plurality of external radius' (Rext, Rext') given each by one of said first arched sections of the first side wall curvature of said second bend portion and at least said first internal radius (Rint) given by said second side wall curvature of said second bend portion.

10. An auxiliary power unit intake duct according to claim 9, wherein the second aerodynamic guide vane is shorter than the first aerodynamic guide vane.

11. An auxiliary power unit intake duct according to claim 9, wherein the intake duct has a substantially quadrangular horizontal cross section.

12. An auxiliary power unit intake duct according to claim 8, wherein a first curved section of the first aerodynamic guide vane is located in a radial position R1 in the middle between the first external radius (Rext) given by a first arched section of the first side wall curvature, and a first internal radius (Rint) given by a first arched section of the second side wall curvature of said second bend portion, and a second curved section of the curved first aerodynamic guide vane is located in a radial position R1' in the middle between a second external radius (Rext') given by a second arched section of the first side wall curvature and a second internal radius (Rint') given by a second arched section of the second side wall curvature.

13. An auxiliary power unit intake duct according to claim 12, wherein the second aerodynamic guide vane is shorter than the first aerodynamic guide vane.

14. An auxiliary power unit intake duct according to claim 12, wherein the intake duct has a substantially quadrangular horizontal cross section.

15. An auxiliary power unit intake duct according to claim 8, wherein a first curved section of the second aerodynamic guide vane is located in a radial position R2 in the middle between the first guide vane radius (R1) given by a first arched section of the first side wall curvature, and a first internal radius (Rint) given by a first arched section of the second side wall curvature of said second bend portion, and a second curved section of the curved second aerodynamic guide vane is located in a radial position R2' in the middle between the first guide vane radius (R1')given by a second arched section of the first side wall curvature and a second internal radius (Rint') given by a second arched section of the second side wall curvature.

16. An auxiliary power unit intake duct according to claim 15, wherein the in take duct has a substantially quadrangular horizontal cross section.

17. An auxiliary power unit intake duct according to claim 8, wherein the second aerodynamic guide vane is shorter than the first aerodynamic guide vane.

18. An auxiliary power unit intake duct according to claim 17, wherein the intake duct has a substantially quadrangular horizontal cross section.

19. An auxiliary power unit intake duct according to claim 8, wherein the intake duct has a substantially quadrangular horizontal cross section.

20. An auxiliary power unit intake duct according to claim 1, wherein the intake duct has a substantially quadrangular horizontal cross section.

* * * * *